US011048882B2

(12) United States Patent
Allen et al.

(10) Patent No.: US 11,048,882 B2
(45) Date of Patent: *Jun. 29, 2021

(54) AUTOMATIC SEMANTIC RATING AND ABSTRACTION OF LITERATURE

(71) Applicant: INTERNATIONAL BUSINESS MACHINES CORPORATION, Armonk, NY (US)

(72) Inventors: Corville O. Allen, Morrisville, NC (US); Scott R. Carrier, Apex, NC (US); Eric Woods, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/733,567

(22) Filed: Jan. 3, 2020

(65) Prior Publication Data

US 2020/0184152 A1    Jun. 11, 2020

Related U.S. Application Data

(63) Continuation of application No. 16/171,988, filed on Oct. 26, 2018, now Pat. No. 10,565,313, which is a continuation of application No. 15/355,767, filed on Nov. 18, 2016, now Pat. No. 10,127,225, which is a continuation of application No. 13/772,017, filed on Feb. 20, 2013, now Pat. No. 9,535,899.

(51) Int. Cl.
*G06F 40/30* (2020.01)
*G06N 3/063* (2006.01)

(52) U.S. Cl.
CPC .................. *G06F 40/30* (2020.01)

(58) Field of Classification Search
CPC ......................... G06F 16/316; G06F 3/0483
See application file for complete search history.

(56) References Cited

U.S. PATENT DOCUMENTS 6,003,070 A    12/1999    Frantz
6,064,980 A     5/2000    Jacobi
(Continued)

FOREIGN PATENT DOCUMENTS

| WO | 2004006546 A2 | 1/2004 |
| WO | 2008109485 A1 | 9/2008 |
| WO | 2009021198    | 2/2009 |

OTHER PUBLICATIONS

Meeson Jr., et al., "An Evaluation of Data Abstraction for Software Modification", IP.com No. IPCOM000151064D, IP.com Electronic Publication: Apr. 19, 2007, 49 pages.
(Continued)

*Primary Examiner* — Shreyans A Patel
(74) *Attorney, Agent, or Firm* — Teddi E. Maranzano

(57) ABSTRACT

Deep semantic analysis is performed on an electronic literary work in order to detect plot elements and optional other storyline elements such as characters within the work. Multiple levels of abstract are generated into a model representing the literary work, wherein each element in each abstraction level may be independently rated for preference by a user. Through comparison of multiple abstraction models and one or more user rating preferences, one or more alternative literary works may be automatically recommended to the user.

20 Claims, 5 Drawing Sheets

(56) References Cited

U.S. PATENT DOCUMENTS

| | | | |
|---|---|---|---|
| 6,289,342 B1 | 9/2001 | Lawrence | |
| 6,317,700 B1 | 11/2001 | Bagne | |
| 6,580,437 B1 | 6/2003 | Liou | |
| 6,711,465 B2 | 3/2004 | Tomassi | |
| 6,874,123 B1* | 3/2005 | DeStefano | G06N 5/02 |
| | | | 715/234 |
| 6,886,010 B2 | 4/2005 | Kostoff | |
| 7,058,567 B2 | 6/2006 | Ait-Mokhtar | |
| 7,115,297 B2 | 10/2006 | Stillman | |
| 7,269,568 B2 | 9/2007 | Stiles | |
| 7,493,190 B1 | 2/2009 | Tomassi | |
| 7,783,249 B2 | 8/2010 | Robinson | |
| 7,788,084 B2 | 8/2010 | Brun et al. | |
| 8,200,688 B2 | 6/2012 | Messer | |
| 8,306,921 B2 | 11/2012 | Kalik | |
| 8,682,918 B2 | 3/2014 | Ramanujam, Sr. | |
| 9,026,934 B1* | 5/2015 | Shah | G06F 3/0483 |
| | | | 715/776 |
| 9,098,489 B2 | 8/2015 | Zuev | |
| 9,153,089 B1 | 10/2015 | Hewett | |
| 9,298,802 B2 | 3/2016 | Allen | |
| 9,535,899 B2 | 1/2017 | Allen et al. | |
| 9,535,901 B2 | 1/2017 | Allen et al. | |
| 9,569,726 B2 | 2/2017 | Horvitz et al. | |
| 9,613,098 B2 | 4/2017 | Allen | |
| 10,108,673 B2 | 10/2018 | Allen | |
| 10,120,908 B2 | 11/2018 | Allen | |
| 10,127,225 B2 | 11/2018 | Allen et al. | |
| 10,565,313 B2 | 2/2020 | Allen | |
| 2002/0022956 A1 | 2/2002 | Ukrainczyk | |
| 2002/0026459 A1 | 2/2002 | Fernandez | |
| 2002/0103799 A1 | 8/2002 | Bradford | |
| 2002/0107742 A1 | 8/2002 | Magill | |
| 2002/0147619 A1 | 10/2002 | Floss | |
| 2002/0165787 A1 | 11/2002 | Bates | |
| 2002/0184188 A1 | 12/2002 | Mandyam et al. | |
| 2003/0225773 A1 | 12/2003 | Jenssen | |
| 2004/0249791 A1 | 12/2004 | Waters | |
| 2005/0114399 A1 | 5/2005 | Hosoi | |
| 2005/0120015 A1 | 6/2005 | Marum Campos | |
| 2005/0165600 A1 | 7/2005 | Kasravi et al. | |
| 2005/0257400 A1 | 11/2005 | Sommerer | |
| 2006/0122807 A1 | 6/2006 | Wittkowski | |
| 2006/0242180 A1 | 10/2006 | Graf et al. | |
| 2007/0150456 A1* | 6/2007 | Lian | G09B 5/06 |
| 2007/0204211 A1 | 8/2007 | Paxson | |
| 2007/0208545 A1 | 9/2007 | Wittkowski | |
| 2007/0214100 A1 | 9/2007 | Marfatia et al. | |
| 2007/0292826 A1 | 12/2007 | Goddy | |
| 2008/0227100 A1 | 9/2008 | Johnson | |
| 2008/0235576 A1 | 9/2008 | Bringsjord | |
| 2008/0249658 A1 | 10/2008 | Walker | |
| 2008/0256066 A1 | 10/2008 | Zuckerman | |
| 2009/0006397 A1 | 1/2009 | Lehtiniemi et al. | |
| 2009/0063426 A1* | 3/2009 | Crouch | G06F 16/316 |
| 2009/0089133 A1 | 4/2009 | Johnson | |
| 2009/0157714 A1 | 6/2009 | Stanton et al. | |
| 2009/0234720 A1 | 9/2009 | George | |
| 2009/0248399 A1 | 10/2009 | Au | |
| 2009/0276253 A1 | 11/2009 | Alspaugh | |
| 2010/0100826 A1 | 4/2010 | Hawthorne et al. | |
| 2010/0169803 A1 | 7/2010 | Mazzei et al. | |
| 2010/0228693 A1 | 9/2010 | Dawson | |
| 2010/0235165 A1 | 9/2010 | Todhunter et al. | |
| 2010/0235465 A1* | 9/2010 | Thorpe | H04L 47/22 |
| | | | 709/217 |
| 2011/0066970 A1 | 3/2011 | Burrier | |
| 2011/0093449 A1 | 4/2011 | Belenzon | |
| 2011/0110599 A1 | 5/2011 | Sata | |
| 2011/0191212 A1 | 8/2011 | Iburg | |
| 2011/0270607 A1 | 11/2011 | Zuev | |
| 2012/0077178 A1 | 3/2012 | Bagchi et al. | |
| 2012/0158172 A1 | 6/2012 | Wencslao | |
| 2012/0215347 A1 | 8/2012 | Illingworth | |
| 2012/0239188 A1 | 9/2012 | Sugimoto | |
| 2012/0245923 A1 | 9/2012 | Brun | |
| 2012/0254333 A1 | 10/2012 | Chandramouli | |
| 2012/0284088 A1 | 11/2012 | Yokoyama | |
| 2012/0323725 A1 | 12/2012 | Johnston | |
| 2013/0024391 A1 | 1/2013 | Vakil | |
| 2013/0040556 A1 | 2/2013 | Robinson | |
| 2013/0080471 A1 | 3/2013 | Forte et al. | |
| 2013/0096909 A1 | 4/2013 | Brun | |
| 2013/0166042 A1 | 6/2013 | Sharma | |
| 2013/0218914 A1 | 8/2013 | Stavrianou | |
| 2013/0275417 A1 | 10/2013 | Fernandes | |
| 2014/0079297 A1 | 3/2014 | Tadayon | |
| 2014/0236573 A1 | 8/2014 | Allen | |
| 2014/0258301 A1 | 9/2014 | Misra | |
| 2014/0303774 A1 | 10/2014 | Schwarzli | |
| 2014/0379331 A1 | 12/2014 | Allen | |
| 2015/0154246 A1 | 6/2015 | Allen | |
| 2015/0154278 A1 | 6/2015 | Allen | |
| 2016/0004766 A1 | 1/2016 | Danielyan | |
| 2016/0019741 A1 | 1/2016 | Dua | |
| 2017/0068660 A1 | 3/2017 | Allen | |
| 2019/0005097 A1 | 1/2019 | Allen | |
| 2019/0042626 A1 | 2/2019 | Allen | |
| 2019/0065472 A1 | 2/2019 | Allen et al. | |
| 2020/0184152 A1 | 6/2020 | Allen | |

OTHER PUBLICATIONS

Guarino et al., "The Evolution of Abstraction in Programming Languages", IP.com No. IPCOM000148048D, IP.com Electronic Publication: Mar. 28, 2007, 45 pages.

Allen, James F., et al., "Deep Semantic Analysis of Text", retrieved on Oct. 27, 2012 from http://aclweb.org/anthology-new/W/W08/W08-2227.pdf.

McCarty, L. Thorne, "Deep Semantic Interpretations of Legal Texts",retrieved on Nov. 27, 2012 from http://remus.rutgers.edu/cs440/icail07-acm.pdf.

Wikipedia; "Smith-Waterman algorithm"; retrieved from http://en.wikipedia.org/wiki/Smith-Waterman_algorithm on Feb. 5, 2013.

Maggiani, R.; "Method for Customizing Queries Based on User Preferences for Searching Online Content and Returning Customized Results"; published by IP.com, Feb. 10, 2009.

Anonymous; "Method and Apparatus for User Authentication Based on Dynamic Question-Answer Generation from Social Networks Data"; published by IP.com, Mar. 19, 2012.

Ferrucci, D.; "Building Watson; An Overview of the DeepQA Project"; retrieved on Nov. 11, 2011 from http://www.stanford.edu/class/cs124/AIMagzine-DeepQA.pdf.

IBM; "High Throughput Computing on IBM's Blue Gene/P".

IBM; "IBM System Blue Gene/P Solution".

IBMresearch; "DeepQA Project FAQ's"; retrieved on Sep. 13, 2011 from http://www.research.ibm.com/deepqa/faq.shtml.

IBMresearch; "Unstructured Information Management Architecture (UIMA)"; retrieved on Oct. 19, 2011 from http://domino.research.ibm.com.

USPTO; first Office Action (dated Sep. 14, 2017) in a Related U.S. Appl. No. 15/355,767, filed Nov. 18, 2016 by Corville O. Allen.

IBM; reply (Dec. 14, 2017) to first Office Action (dated Sep. 14, 2017) in a Related U.S. Appl. No. 15/355,767, filed Nov. 18, 2016 by Corville O. Allen.

USPTO; second Office Action (dated Mar. 15, 2018) in a Related U.S. Appl. No. 15/355,767, filed Nov. 18, 2016 by Corville O. Allen.

IBM; reply (May 17, 2018) to second Office Action (dated Mar. 15, 2018) in a Related U.S. Appl. No. 15/355,767, filed Nov. 18, 2016 by Corville O. Allen.

USPTO; Notice of Allowance (dated Jul. 6, 2018) in a Related U.S. Appl. No. 15/355,767, filed Nov. 18, 2016 by Corville O. Allen.

USPTO; first Office Action (dated May 12, 2015) in a Related U.S. Appl. No. 14/485,692, filed Sep. 13, 2014 by Corville O. Allen.

IBM; reply (Aug. 12, 2015) to first Office Action (dated May 12, 2015) in a Related U.S. Appl. No. 14/485,692, filed Sep. 13, 2014 by Corville O. Allen.

(56) References Cited

OTHER PUBLICATIONS

USPTO; second Office Action (dated Oct. 13, 2015) in a Related U.S. Appl. No. 14/485,692, filed Sep. 13, 2014 by Corville O. Allen.
IBM; reply (Nov. 2, 2015) to second Office Action (dated Oct. 13, 2015) in a Related U.S. Appl. No. 14/485,692, filed Sep. 13, 2014 by Corville O. Allen.
USPTO; third Office Action (dated Dec. 17, 2015) in a Related U.S. Appl. No. 14/485,692, filed Sep. 13, 2014 by Corville O. Allen.
IBM; reply (Mar. 30, 2016) to third Office Action (dated Dec. 17, 2015) in a Related U.S. Appl. No. 14/485,692, filed Sep. 13, 2014 by Corville O. Allen.
USPTO; fourth Office Action (dated Apr. 26, 2016) in a Related U.S. Appl. No. 14/485,692, filed Sep. 13, 2014 by Corville O. Allen.
IBM; AFCP request (Jul. 26, 2016) to fourth Office Action (dated Dec. 17, 2015) in a Related U.S. Appl. No. 14/485,692, filed Sep. 13, 2014 by Corville O. Allen.
USPTO; Notice of Allowance (dated Aug. 30, 2016) in a Related U.S. Appl. No. 14/485,692, filed Sep. 13, 2014 by Corville O. Allen.
Ait-Mokhtar; "Robustness beyond Shallowness:Incremental Deep Parsing"; Retrieved on Aug. 28, 2013 from http://pageperso.lif.univ-mrs.fr/~edouard.thiel/RESP/Semi/2006/ROUX/idp.pdf.
NTC's Dictionary of Literary Terms;" To The User" section; McGraw-Hill publishers, 1998.
Declerck et al., "Linguistic and Semantic Representation of the Thompson's Motif-Index of Folk-Literature", Research and Advanced Technology for Digital Libraries, International Conference on Theory and Practice of Digital ibraries, TPDL 2011, Sep. 26-28, 2011, pp. 151-158.
Disclosed Anonymously, "Enhancing Text to Speech by User Context and Preferences"; IP.com Prior Art Database Technical Disclosure, IP.com No. IPCOM000232293D, Electronic Publication Date; Oct. 30, 2013, 4 pages.
IBM, "A Method of Using Electronic Perpetual Vending Machine Operational Data to Detect Operational Problems with Vending Machines Networked Together via Either Wireless or Telephone Lines to a Managed Operations Central Server Environment and Notification of Problems via Electronic Means, Wireless Mea . . . ", P.com Prior Art Database Technical Disclosure, IP.com No. IPCOM000015112D, IP.com Electronic Publication Date: Jun. 20, 2003, 2 pages.
IBM, "Automatically Applying Constructs to Form Elements based on Semantic Analysis of the bound XML Instance Elements", IP.com Prior Art Database Technical Disclosure, IP.com No. IPCOM000152210D, IP.com Electronic Publication: Apr. 26, 2007, pp. 1-7.
IBM, "Method for Communicating Information to and for Traveling Users", IP.com Prior Art Database Technical Disclosure, IP.com No. IPCOM000111043D, IP.com Electronic Publication: Mar. 26, 2005, 5 pages.
IBM, "Vending machine management system", IP.com Prior Art Database Technical Disclosure, IP.com No. IPCOM000127333D, IP.com Electronic Publication Date: Aug. 24, 2005, 4 pages.
IBM, Applicant's Reply, dated Jan. 13, 2016, for Office Action dated Oct. 13, 2015, U.S. Appl. No. 14/489,652, filed Aug. 18, 2015.
IBM, Applicant's Reply, dated Oct. 12, 2016, U.S. Appl. 14/491,052, filed Sep. 19, 2014.
IBM; reply (Aug. 16, 2017) to first office action in related U.S. Appl. No. 15/148,733, filed May 5, 2016 by Corville O. Allen, et al.
IBM; reply (Aug. 21, 2017) to first office action (dated May 3, 2017) in related U.S. Appl. No. 15/149,023, filed May 6, 2016 by Corville O. Allen, et al.
IBM; reply (Dec. 12, 2017) to first office action (dated Oct. 10, 2017) in related U.S. Appl. No. 15/149,023, filed May 6, 2016 by Corville O. Allen, et al.
IBM; reply (Dec. 12, 2017) to second office action in related U.S. Appl. No. 15/148,733, filed May 5, 2016 by Carville O. Allen, et al.
Kasavana, "V-Commerce: Understanding Vending Machine Technology", Hospitality Net™, Apr. 19, 2002, 9 pages, http://www.hospitalitynet.org/news/4011592.html.
Linkspringer; "Linguistic and Semantic Representation of the Thompson's Motif-Index and Folk-Literature"; Retrieved on Aug. 28, 2013 from http://link.springer.com/chapter/10.1007/978-3-642-24469-8_17.
Long et al., "Towards Understanding Traveler Behavior in Location-Based Social Networks", Globecom 2013-Symposium on Selected Areas in Communications, 2013 IEEE, pp. 3182-3187.
Mohammadnezhad et al., "An Effective Model for Improving the Quality of Recommender Systems in Mobile E-Tourism", International Journal of Computer Science & Information Technology (IJCSIT) vol. 4, No. 1, Feb. 2012, pp. 83-92.
NBC News, "Smart Vending Machine Scans Your Face to Serve Up Snacks", Mar. 5, 2014, 2 pages, https://www.nbcnews.com/tech/innovation/smart-vending-machine-scans-your-face-serve-snacks-n45546.
Redbox, "How does your billing process work?", Redbox Help Center, printed Nov. 19, 2019, 3 pages, https://redbox.custhelp.com/app/answers/list/kw/how%20does%20your%20billing%20process%20work.
Redbox, "What should I do if the box is out of service or full, and it won't accept my movie?", Redbox Help Center, Printed Nov. 19, 2019, 4 pages, https://redbox.custhelp.com/app/answers/list/kw/what%20should%201%20do%20if%20the%20box%20is%20out%20of%20service%20or%20full,%20and%20it%20won't%20accept%20my%20movie.
Ross, Jr., "Computer-Aided Study of Literary Language", IP.com Prior Art Database Technical Disclosure, IP.com No. IPCOM000131345D, Original Publication Date: Aug. 1, 1978, Original Disclsoure Information: IEEE computer, vol. 11, No. 8, pp. 38-39.
USPTO Office Action, dated Oct. 13, 2015, U.S. Appl. No. 14/489,652, filed Aug. 18, 2015.
USPTO Office Action, dated Apr. 6, 2016, U.S. Appl. No. 14/489,652, filed Aug. 18, 2015.
USPTO Office Action, dated Apr. 7, 2016, U.S. Appl. No. 14/094,889, filed Dec. 3, 2013.
USPTO Office Action, dated Jul. 12, 2016, U.S. Appl. No. 14/491,052, filed Sep. 19, 2014.
USPTO; first office action dated May 3, 2017 in related U.S. Appl. No. 15/149,023, filed May 6, 2016 by Corville O. Allen, et al.
USPTO; first office action dated May 17, 2017 in related U.S. Appl. No. 15/148,733, filed May 5, 2016 by Carville O. Allen, et al.
USPTO; notice of allowance dated Dec. 17, 2015 in related U.S. Appl. No. 14/094,934, filed Dec. 3, 2013 by Corville O. Allen, et al.
USPTO; second Office Action (dated Oct. 12, 2017) in a Related U.S. Appl. No. 15/148,733, filed May 5, 2016 by Corville O. Allen.
USPTO; second office action dated Oct. 10, 2017 in related U.S. Appl. No. 15/149,023, filed May 6, 2016 by Corville O. Allen, et al.
Wikipedia; "Cluster Analysis";Retrieved on May 15, 2013 from http://en.wikipedia.org/wiki/Cluster_analysis.
Disclosed Anonymously, Method to extract simple and compound terms from text corpuses (without Derforming full semantic analysis), IP.com Prior Art Database Technical Disclosure, IP.com No. IPCOM000220204D, IP.com Electronic Publication: Jul. 25, 2012, 6 pages.
USPTO; first office action dated Aug. 25, 2015 in related U.S. Appl. No. 14/094,934, filed Dec. 3, 2013 by Corville O. Allen, et al.
IBM; reply (Nov. 23, 2015) to first office action (dated Aug. 25, 2015) in related U.S. Appl. No. 14/094,934, filed Dec. 3, 2013 by Corville O. Allen, et al.
USPTO; notice of allowance dated Nov. 17, 2016 in related U.S. Appl. No. 14/491,052, filed Sep. 19, 2014 by Corville O. Allen, et al.

* cited by examiner

AUTOMATIC SEMANTIC RATING AND ABSTRACTION OF LITERATURE

BACKGROUND

The invention generally relates to systems and methods for automatically extracting plot and character elements from works of literature at varying levels of abstraction, thereby enabling and providing automated comparison between works of literature and recommendation of alternative works of literature.

In the context of the present disclosure and the related art, "works of literature" will be used to refer to textual writings which are readily encoded into computer files, such as ASCII text, ANSI text, Hypertext Transfer Markup Language (HTML), eXtensible Markup Language (XML), portable document format (PDF), word processor files (e.g. *.doc, *.docx, *.odt, *.wpd, etc.), ebook files and the like. The content of these files may represent digital novels, books, textbooks, reference books, poetry, lyrics, magazines, journals, short stories, catalogs, research papers, user manuals and the like, each of which may have a structural syntax such as a table of contents, and index, one or more chapters with one or more sections and subsections. These works will be referred to collectively as "digital literature" for the purposes of the present disclosure.

Many online services which provide access to digital literature, such as online book stores, online libraries and online research centers attempt to provide suggestions for similar literary works to users when they search for or purchase a particular literature item. Such recommendations can increase sales, improve customer affinity, and lead to better research of a subject matter.

SUMMARY

Deep semantic analysis is performed on an electronic literary work in order to detect plot elements and optional other storyline elements such as characters within the work. Multiple levels of abstract are generated into a model representing the literary work, wherein each element in each abstraction level may be independently rated for preference by a user. Through comparison of multiple abstraction models and one or more user rating preferences, one or more alternative literary works may be automatically recommended to the user.

BRIEF DESCRIPTION OF THE DRAWINGS

The description set forth herein is illustrated by the several drawings.

DETAILED DESCRIPTION

Figure 1:
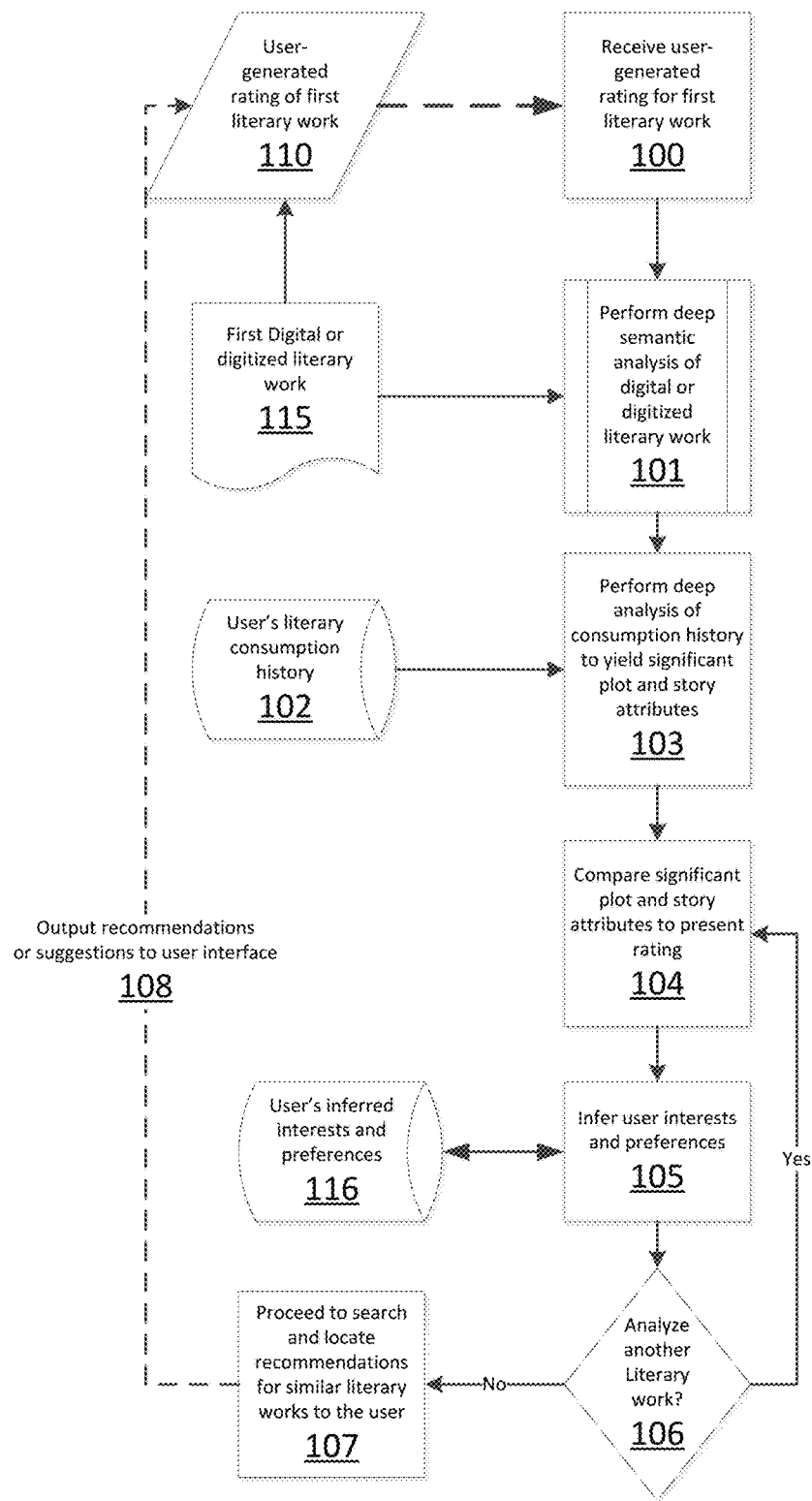
FIG. 1 illustrates an overall logical process according to the present invention.
Figure 2:
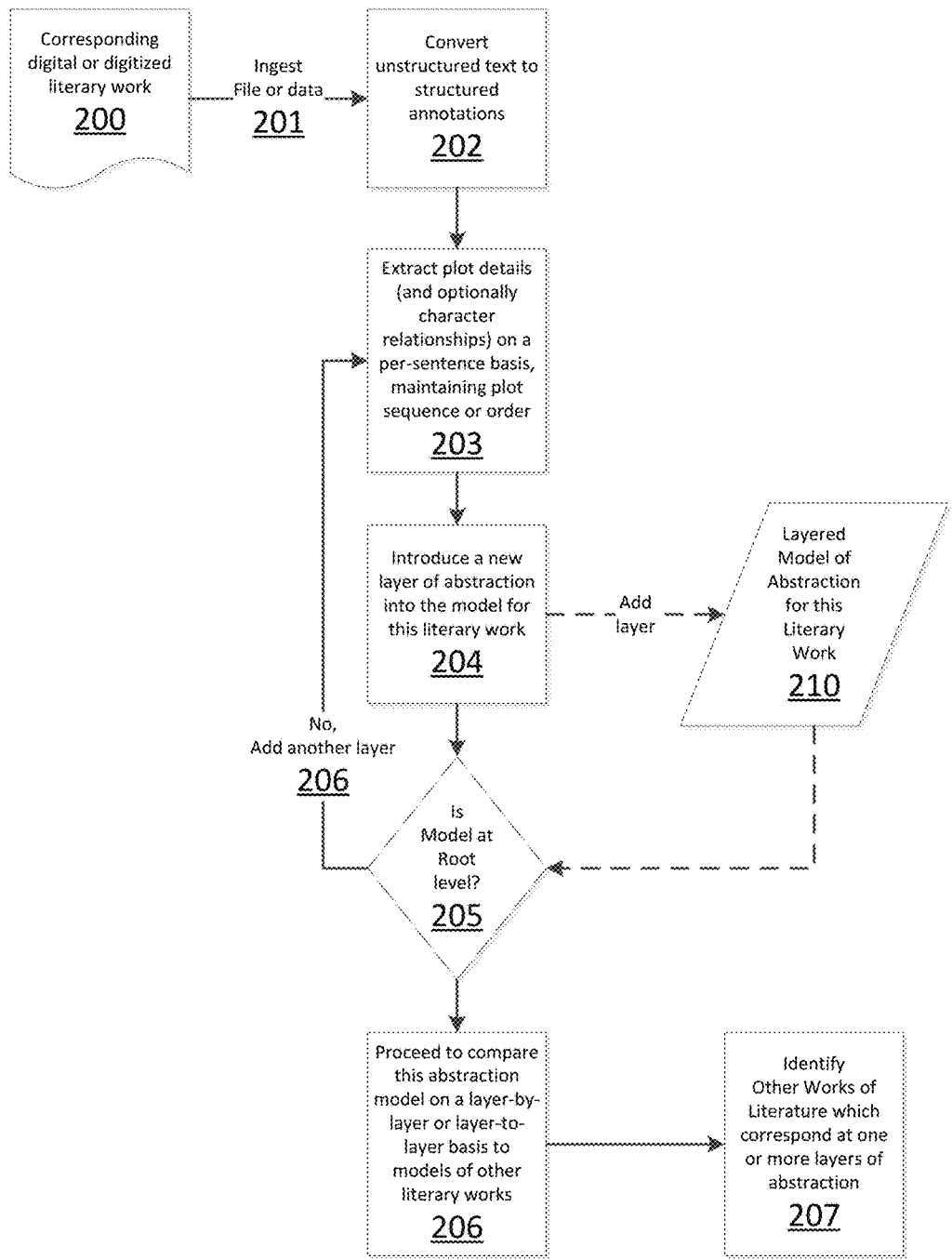
FIG. 2 provides additional details of a logical process according to the present invention for building a multi-layer abstraction model of the analyzed literary work.

The inventors of the present and the related invention have recognized problems not yet recognized by those skilled in the relevant arts. Today, comparison of two or more digital literary pieces is "shallow" and largely based on high level concepts, genres, or main plot elements. For example, a person that likes one suspense/thriller literary work is likely to consider other suspense/thriller literary works simply because they belong to the same genre of literature. So, by "shallow", we mean comparison of literature pieces in the present art typically only extends to one level of analysis, namely genre. In addition, analysis of plot elements within each work of literature requires human effort to understand and comprehend the concepts of interest that make literary pieces similar to The present inventors have recognized this problem of manually driven comparisons of literature, and, having reviewed the available technology to address the problem, have found no suitable, useful solution. Thus, the present invention was developed.

The inventors further realized that the present-day methodology also fails to consider the nuances or deep semantics that make two literary pieces similar both conceptually and in writing style. And, in further consideration of the virtual explosion of digitally published pieces of literature, including digital books (eBooks), digital sheet music, web pages, blogs, self-published books, etc., the task of manually reading, comprehending, and comparing digital literature is rapidly becoming unwieldy, while customers of online digital literature expect instant access to similar works with little or no human input or wait time.

The invention disclosed herein addresses the current problems as well as addresses the future demands of such online systems for accessing, distributing, and purchasing digital literature.

Following the disclosure of illustrative embodiments of the present invention, a discussion of the reviewed available technology and a comparison to the presently-disclosed methods and systems is provided.

Deep Semantics.

The term "deep semantic" relationships, for the purposes of the present disclosure, is meant to refer to relationships between information entities in a given context and how they relate to each other. They can be the occurrence of triple store terms or entities or they can be the occurrence with a relationship of those entities. For example, (Mutation, Cancer, Organ) would be a semantic relationship, identifying that mutations, cancer and specific organ ontologies have a deep relationship. Further, a deep semantic analysis system sometimes associates a specific relationship (mass, ?indicates, metastasis), where the combination and synonyms for "indicates" would mean the cancer has metastasized.

The term deep semantic relationship may also refer to the relationship of terms in a specific ontology and their similarity when expressed in passages of text based on the how they are typically expressed using sequence matching algorithms for text analysis. For example, the well-known Smith-Waterman sequence-matching algorithm measures the lengths of the longest similar subsequence between two texts, which is then a measured or detected semantic relationship between those texts.

Deep semantic relationships consider the meaning of words within the context and structure of a sentence. They signify a "deep" understanding the meaning of words that comprise a relationship within the sentence. Deep semantic relationships are usually developed with a very specific use case in mind. For example, consider the sentence "John bought bread at the store." From this, a relationship like sold (store, bread) may be mined, indicating that the store sold bread. This relationship requires a deep understanding of what a store is (a retailer that sells consumable goods) and that bread is one of those items.

For example, one "specific use" in which deep semantic analysis has been proposed is the deep semantic interpretations of legal texts as proposed by L. Thorne McCarty of Rutgers University (Association of Computer Machinery (ACM), 971-1-59593-680).

One may contrast deep semantic relationships with shallow semantic relationships, that latter of which usually only consider the structure of parts of speech within a sentence, and not necessarily the meanings of those words. An example shallow relationship may simply be of the form sentence (subject, verb, object). In the above example, this would be sentence (john, bought, bread). These terms don't signify any special meaning, but their parts of speech form a shallow relationship called "sentence".

Graphical logical forms for representation of text can be created using one of several known methods, such as that proposed by James F. Allen, Mary Swift, and Will de Beaumont, of the University of Rochester and the Institute for Human and Machine Cognition (Association for Computer Linguistics (ACL), anthology document W08-2227).

General Method and Embodiments of the Invention.

Disclosed is a method or process of decomposing a digital literary piece into deep semantic relationships at varying levels of abstraction, wherein the first level of abstraction captures as many plot elements as possible, and wherein each subsequent level represents further abstraction of storyline or plot details, until high level concepts begin to emerge. From this semantic analysis, user sentiment to the literary attributes are inferred and used to identify similar literature at varying levels of abstraction and detail. This method is advantageous to the prior art because it performs deep semantic analysis of literature at varying levels of abstraction. Doing so allows two pieces of digital or digitized literature to be compared to each other at varying levels of semantic analysis, offering a deep or shallow comparison as desired. An additional benefit of the presently disclosed method is that the current methods focus on shallow semantic analysis, which simply understands similarity of patterns and words as they appear in the text. The disclosed system employs deep semantic analysis, which analyzes the concepts of the text at a deeper level than pattern and term or key word matching.

A general method according to the invention, shown in FIG. 1, proceeds as follows:
- a) A human user reads a first literary work (115) and rates it online. The rating (11) is received (110) by a computer system according to the present invention.
- b) The computer system, equipped with certain components to perform logical processes disclosed herein, performs deep analysis (101) of the digital literary work (115) at various layers of abstraction, as set forth in more details in the following paragraphs.
- c) Based on deep analysis (103) of the user's literary work consumption history (102), significant plot elements and attributes (116) that impact the user's ratings are inferred (104, 105) at the various levels of abstraction.
- d) Deep analysis of two or more books may be performed (106), and this system may be used to compare them to each other to determine similarity. Ultimately, one or more recommendations or suggestions (107, 108) are made to the user via a user interface for other literary works which the user may find interesting according to one of the additional levels of abstraction beyond the first level (e.g. beyond genre or author).

Example Logical Process Implementation.

The following logical process according to the invention performs the deep analysis and inferring as mentioned in the foregoing general process description:
- a. The system ingests (201) a digital or digitized literary work (200) corresponding to the literary work for which a rating was received.
- b. The system extracts (203) plot points in as much detail as possible:
  - i. Deep semantic relationships are used to convert (202) the unstructured text to structured annotations, revealing (203) detailed plot elements on a per-sentence basis.
  - ii. The plot points are maintained in sequential order.
- c. The system introduces (204) a layer of abstraction model (210) on the previous layer's plot elements to express fewer plot elements at a higher level of abstraction (e.g. less details).
  - i. The previous layer's plot elements are grouped and annotated with umbrella annotations representing the grouping.
  - ii. Introduction of additional layers of abstraction is repeated (205, 203, 204) to produce increasing levels of abstraction (210) of the plot elements until higher level concepts may not be extracted.
  - iii. The process of adding layers stops when a root node is reached (205), such as the book's genre (e.g. "mystery", "drama", etc.).
- d. The same process is performed, optionally, for additional digital literary works.
- e. Literary works, such as novels or magazines, may be compared (206) to one another at varying levels of abstraction, allowing shallow or deep comparison to one another, and identification (207) of alternative literary works which may be interesting or of use to the user at any particular level (layer) of abstraction.

Structured Annotations.

In the foregoing steps, the term "structured annotations" refers to at least one available embodiment of metadata (data about data). According to this exemplary embodiment, the structure annotation constitutes information regarding where that data can be found in a given passage or text, and contains the raw value of the selected text, keywords or terms. It usually has a preferred or interpreted value for the term, usually also contains further metadata describing that term in a specific context.

For example, the text "Peter" may be designated as an annotation with metadata: Noun—parts of speech, Lead Character, Brother to Kayla.

Another example, the text "Sam and Sarah felt anguish over the loss of the wood" may be denoted as the raw value of an annotation, with metadata "Sadness", where the term "sadness" is derived from the deep semantic analysis of the text to not only parse the phrase for structure, but also determine the meaning of the words.

Example of Operation.

For illustration of how embodiments of the invention accomplish these objectives, we now turn to an example processing of text from a well-known work of literature, a paragraph from William Golding's "Lord of the Flies":
- a. "He took off his glasses and held them out to Ralph, blinking and smiling, and then started to wipe them against his grubby wind-breaker. An expression of pain and inward concentration altered the pale contours of his face. He smeared the sweat from his cheeks and quickly adjusted the spectacles on his nose."

Using deep semantic analysis, the system decomposes the excerpt in this example into the first layer of plot points (i.e. the most detailed):
  a. Layer 1 (most detailed, least abstract):
    i. He removed his glasses.
    ii. He offered his glasses to Ralph.
    iii. He blinked.
    iv. He smiled.
    v. He wiped his glasses on his wind-breaker.
    vi. His wind breaker was grubby.
    vii. He showed pain.
    viii. He showed inward concentration.
    ix. His face was pale.
    x. His face expressed pain and inward concentration.
    xi. He wiped the sweat from his face.
    xii. He put his glasses on.
    xiii. He adjusted his glasses.

The system then proceeds to decompose and add a second layer of increasing abstraction (i.e. decreasing level of detail):
  a. Layer 2 (more abstract than Layer 1):
    i. He offered his glasses to Ralph.
    ii. He was happy.
    iii. He cleaned his glasses.
    iv. He expressed pain and inward concentration.
    v. He put his glasses on.

In this stage, the system uses a hypothetical user's history of consumption to determine which of the items 1(a) through 1(1) were correspond to similar abstraction items in other novels the user has consumed (e.g. terms which are likely of interest to the user due to the user's repeated selection of texts with corresponding terms, plot elements, etc.), and accordingly, the system selects items 1(b), 1(d), 1(e), 1(f), 1(g), and 1(k). In this example, the system abstracted items 1(f) and 1(g) by combining them, and abstracted other items by removing details and/or substituting certain terms for more general or broader terms (e.g. substituted "happy" for "smiled" where "smile" is a form or species of happiness).

Those familiar with deep semantic analysis of text will recognize that these functions are within the skill of those in the art to implement. For example, previously mentioned publication "Deep Semantic Analysis of Text" by James F. Allen, Mary Swift, and Will de Beaumont provides at least one publicly available method for deep semantic analysis to generate an abstraction from a detailed block of text. And, such analysis is not limited to novels, but may be applied to any text-based digital work, such as magazines, journals, research papers, etc. It has been illustrated that even legal texts can be analyzed using deep semantics, such as disclosed in "Deep Semantic Interpretations of Legal Texts" by L. Thorne McCarty of Rutgers University (USA).

Now, a third iteration of the abstraction process may be performed to yield another, less detailed model of the text under analysis:
  a. Layer 3 (less detailed than Layer 2 or Layer 1):
    i. He cleaned his glasses with pain and inward concentration.
    ii. He put his glasses on.
  And, it can be iterated yet again:
  a. Layer 4 (less detailed, more abstract than Layer 3):
    i. He had glasses.

At this point, the processing of this short excerpt of text could end because it has reached a single item of abstraction. As one can readily imagine, when analyzing an entire digital literary work which has hundreds or thousands times the length of this excerpt, the layers of abstraction could be many more than this example.

Example of Model of an Entire Novel.

Figure 3:
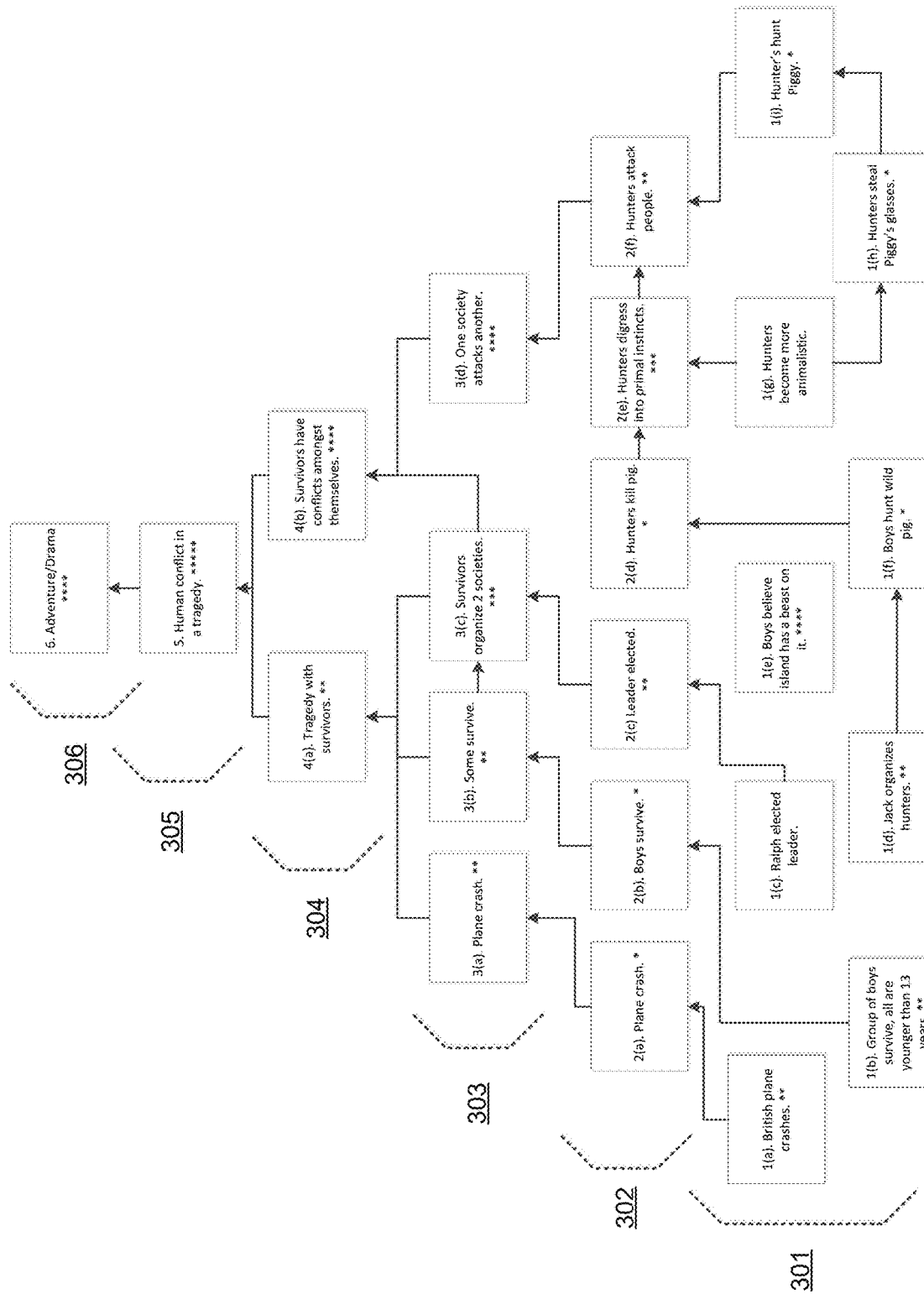
FIG. 3 provides an illustration of such a multi-layer abstraction model, which can be encoded in a data structure suitable for use by an automated process to compare to other models of other literary works.

We now turn to FIG. 3 which illustrates a semantic model of abstraction of the entire novel, not just the excerpt of the previous example. This model representation shows multiple levels of abstraction (301, 302, 303, 304, 305, and 306) which lead to a root level, such as a genre for a novel. Each item is denoted by a layer number N followed by an item ordinal letter (x) in the format of N(x), and a user rating is shown in stars (4 stars being a highly rated item, 1 star being a lowly rated item).

The relationship lines of FIG. 3 are provided to assist the reader in understanding how each item in each layer relates to or leads to one or more items in the next, more abstract layer. Those ordinarily skilled in the art will recognize that the results of semantic analysis are not always two dimensional or planar as shown here, but the illustration is useful for understanding the relationships between items and layers.

In at least one embodiment of the present invention, each item of the multi-layer abstraction model can be represented by a set of attributes as follows, which is conducive to representation in database records, for example:
  a. [<user_rating>-<node>-<level>]
  b. where <user_rating> is a representation of the user's rating (e.g. number of stars, etc.), <node> is the item identifier within a layer (e.g. the ordinal letter of FIG. 3), and <level> is the abstraction layer (e.g. could be absolute such as 1, 2, 3, 4, etc., or relative such as +1, +2, +3, etc.).

Such a notation system can also be captured in an XML-like structure, such as:

a. <literary_work_model>
    i.    <abstraction_model_item>
      1.    <description>string</description>
      2.    <user_rating>****</user_rating>
      3.    <node>x</node>
      4.    <level>N</level>
    ii.   </abstraction_model_item>
    iii.  . . .
  b. </literary_work_model>

In such an XML model, the third level (303) of abstraction of the model shown in FIG. 3 would be captured as follows:

a. <literary_work_model>
    i.    <abstraction_model_item>
      2.    <node>a</node>
      3.    <description>"plane crash"</description>
      4.    <user_rating>**</user_rating>
    ii.   </abstraction_model_item>
    iii.  <abstraction_model_item>
      2.    <node>b</node>

```
            3.      <description>"some survive"</description>
            4.      <user_rating>**</user_rating>
    iv      </abstraction_model_item>
    v.      <abstraction_model_item>
            1.      <level>3</level>
            2.      <node>c</node>
            3.      <description>"survivors organized into 2
societies"</description>
            4.      <user_rating>***</u ser_rating>
    vi.     </abstraction_model_item>
    vii.    <abstraction_model_item>
            1.      <level>3</level>
            2.      <node>d</node>
            3.      <description>"one society attacks anohter"</description>
            4.      <user_rating>****</user_rating>
    viii.           </abstraction_model_item>
b. </literary_work_model>
```

In such a data structure representing the results of the deep semantic analysis of a literary work, the processes according to the present invention are enabled to compare models of different literary works, and to detect similarities between various levels and items within levels to determine alternative literary works which may be of interest to the user based on the user's prior ratings and prior consumption of literary works.

Pseudo-code Process. The following pseudo-code process is provided to the reader for a high-level example of at least one embodiment of the invention:

a. System ingests the electronic literature in its entirety, optionally in part.
b. System runs a series of annotators to extract semantic relationships from text.
   i. Both deep and shallow semantic relations are detected.
   ii. Deep semantic relationship captures atomic event of interest, such as "Ralph blows the conch".
c. The system repeats semantic analysis on the annotations made in the previous iteration.
   i. For consistency, the annotations may be translated to plain-text for consistent processing.
   ii. Each iteration of semantic analysis becomes more generalized, thereby encompassing a broader set of annotations.
d. The process repeats until no further generalization is possible (e.g. the literature's genre is reached).
e. Methods to detect pertinent information/annotations may be employed.

Example Logical Process for Recommendation Engine.

One embodiment of the present invention to realize a recommendation engine which would, based on the foregoing semantic analyses, make suggestions to a user of potential interesting alternative works of literature is based upon a presumption that most users rarely like or prefer all aspects of every work of literature uniformly throughout the work. Although it is presently common to allow users to make only one rating over the entire work, the presumption is that if given more granular rating options, they would provide a range of ratings to different aspects of the work. For example, the user could be prompted to rate each character in the book, to rate the ending of the plot separately from the climax, and to rate the potential for a sequel to the story. Even more granular, the user may be prompted to rate each event within the plot, etc.

While such atomic ratings of a work of literature may be useful in some situations, it is expected that when a system is trying to learn a user's literary preferences, an atomic rating may dilute both what the user liked and disliked.

Overlaying cross-sections within topographical nodes affords the system deep insight into the components of a literary work which users specifically favor—i.e., it isolates the essential elements of a piece that constitute what a user liked. By "cross section", we mean in this context a portion of sub-graph of the total hierarchy of elements as previously disclosed, wherein each layer of the hierarchy represents a different level of abstraction. So, for example, as shown in FIG. 3, a cross section may be taken at "3(c) Survivors organize 2 societies" with its connected elements of a single degree of separation (e.g. 2(c), 3(a), 3(b), 4(a) and 4(b)).

The overlaying process then compares this sub-graph to areas or sub-graphs of other models of other literary works, searching for matches or close matches. When matches or close matches are found, then if the overall rating of both literary works is high, this feature (e.g. survivors, organizing societies) is declared as a likely preferred "literary element".

By "literary element", we are referring to features and components of a storyline which can be considered separate from the storyline, but when arranged into a series and given interrelationships, form the unique storyline of the literary work. For example, an literary element at a high level may be "natural disaster", which is an event type of literary element. Multiple works of literature may have natural disaster events in them, such as earthquakes, storms, floods, disease, etc., but some storylines may start with a natural disaster, while others may include a natural disaster somewhere within the intermediate storyline. Other types of literary elements may include plot events (death, birth, marriage, divorce, infidelity, business transaction, political event, murder, espionage, etc.), moods (comedy, happiness, sadness, horror, mystery, anticipation, etc.), and setting (outdoors, indoors, future, present, past, international, urban, rural, etc.), among others.

Conversely, if a match or close match belongs to two non-preferred works of literature, the feature can be declared as a non-preferred feature. If the overall ratings of both works of literature are different, then no change to the features rating would be made. Then, as the same sub-graph is compared to graphs representing yet additional works of literature, the preference/non-preference rating of the feature can be further increased or decreased according to matches and overall ratings. As such, the degree of preference or non-preference can be measured or predicted with greater certainty for greater numbers of works of literature compared, and the degree of preference or non-preference can be taken from a binary state (prefer or not) to a discrete state (0 to 99, where 0 is strongest non-preference and 99 is strongest preference, 50 is neutral or unknown).

So, without benefit of the present invention, and based on the fact that users often give only an overall rating for the entirety of a literary piece of work, a problem arises that one rating for an entire literary piece doesn't afford much insight into what literary elements the reader enjoyed. For example, was it a plot element, the geographical or time period setting for the story, or a particular character which the reader favored the most?

However, if, according to the present invention, each piece of literature which has been given an overall rating by a user is decomposed into the literary elements (of each piece) using processes according to the present invention, and the overall ratings from the same user can be aggregated across multiple different pieces of literature. By determining the correlation between the elements of the several user-indicated most preferred pieces of literature, it is possible to cross-reference the finite literary elements across the pieces of literature to infer commonalities and distinctions that may have led to the user's preferred ratings. These literary elements which are in common with the preferred pieces of literature can be then associated with a prediction of a user's preference of a piece of literature which he or she has not yet rated.

The same correlation analysis can be performed on the least preferred pieces of literature to determine common elements within them that are associated with overall non-preference of a literary work.

This enables the system to discern which literary elements the user is predictably inclined to enjoy, and which elements the user is predictably disinclined to like. Armed with this information, the system may recommend other pieces of literature which the user has not yet rated, but which include those preferred literary elements, while avoiding the recommendation of pieces of literature which contain elements that are not preferred. As a result, the user's experience in taking the recommendations is predicted to be improved as compared to the current genre-based recommendations of systems of the current art. However, when running the system longitudinally and collecting the user's eventual ratings of recommended literary works, the system may learn and fine tune its predictions of preferred and non-preferred literary elements by adding the newly-received user ratings and models of the pieces of literature to the aggregated works datastore, and by updating the analysis.

Figure 4:
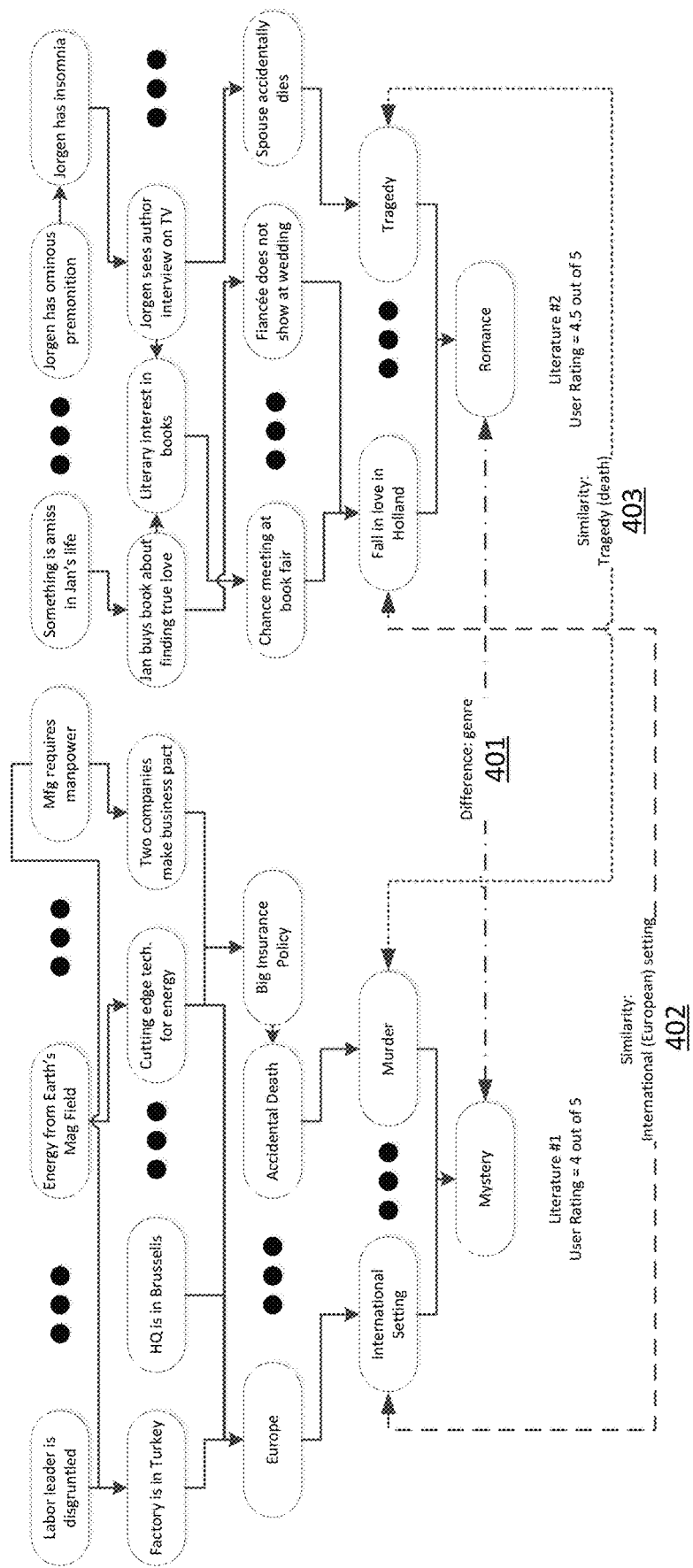
FIG. 4 allows visualization of comparison of two models of two different literary works as performed in at least one embodiment of the invention.

For example, referring now to FIG. 4, two models generated for the same user for two different literary works are graphically shown. As those skilled in the art will recognize, this graphical depiction is for the reader's understanding, but in practice, such a model can be represented in a construct of database records without such a graphical representation but in a manner which is machine readable and machine useable. Both models represent literary works which are highly rated overall by the user. On the left, a model for a hypothetical mystery is shown, and on the right, a hypothetical model for a romance novel is shown. One can see that there is a difference (401) in the genre, so based on just analyzing these two models, it is inconclusive whether the user prefers or not mysteries or romance. However, a bit of a pattern emerges through the similarities of an international setting (possibly even more specifically a European setting), and the similarity of a tragedy (possibly even more specifically an untimely death).

Extending on this analysis and comparison, the more works that are added to the analysis with a greater range of user ratings (strong like to strong dislike), the greater the precision of common elements can be inferred. If, for example, after considering twenty rated literary pieces it is found that of thirteen which are highly rated, nine of them are set in Europe, then a strong preference for literary works set in Europe can be inferred. And, if only three of the highly-rated works involve tragedy and untimely death, then a weak to neutral preference for this plot element can be inferred. If, out of the twenty considered only four are lowly-rated and three of those deal with political themes, then a weak dislike can be inferred from that pattern.

This constitutes a vastly lower signal-to-noise ratio from which to identify and recommend other pieces tailored to a user's unique tastes, without requiring a large corpus of data to infer the essential elements. This data allows the system to perform interesting recommendation methods, such as:

a. The system may surface other literary works that embody the most deep rating patterns appearing within the same sequence of the story.

b. The system could also surface pieces that differ from previous ratings patterns via pivoting on designated rating elements.

i. Example: "I'm looking for something light & humorous . . . surprise me though".

ii. This option recognizes that users might not enjoy additional selections that too closely align with other works that they've enjoyed, i.e. "give me something fresh/new".

Suitable Computing Platform.

The preceding paragraphs have set forth example logical processes according to the present invention, which, when coupled with processing hardware, embody systems according to the present invention, and which, when coupled with tangible, computer readable memory devices, embody computer program products according to the related invention.

Regarding computers for executing the logical processes set forth herein, it will be readily recognized by those skilled in the art that a variety of computers are suitable and will become suitable as memory, processing, and communications capacities of computers and portable devices increases. In such embodiments, the operative invention includes the combination of the programmable computing platform and the programs together. In other embodiments, some or all of the logical processes may be committed to dedicated or specialized electronic circuitry, such as Application Specific Integrated Circuits or programmable logic devices.

Figure 5:
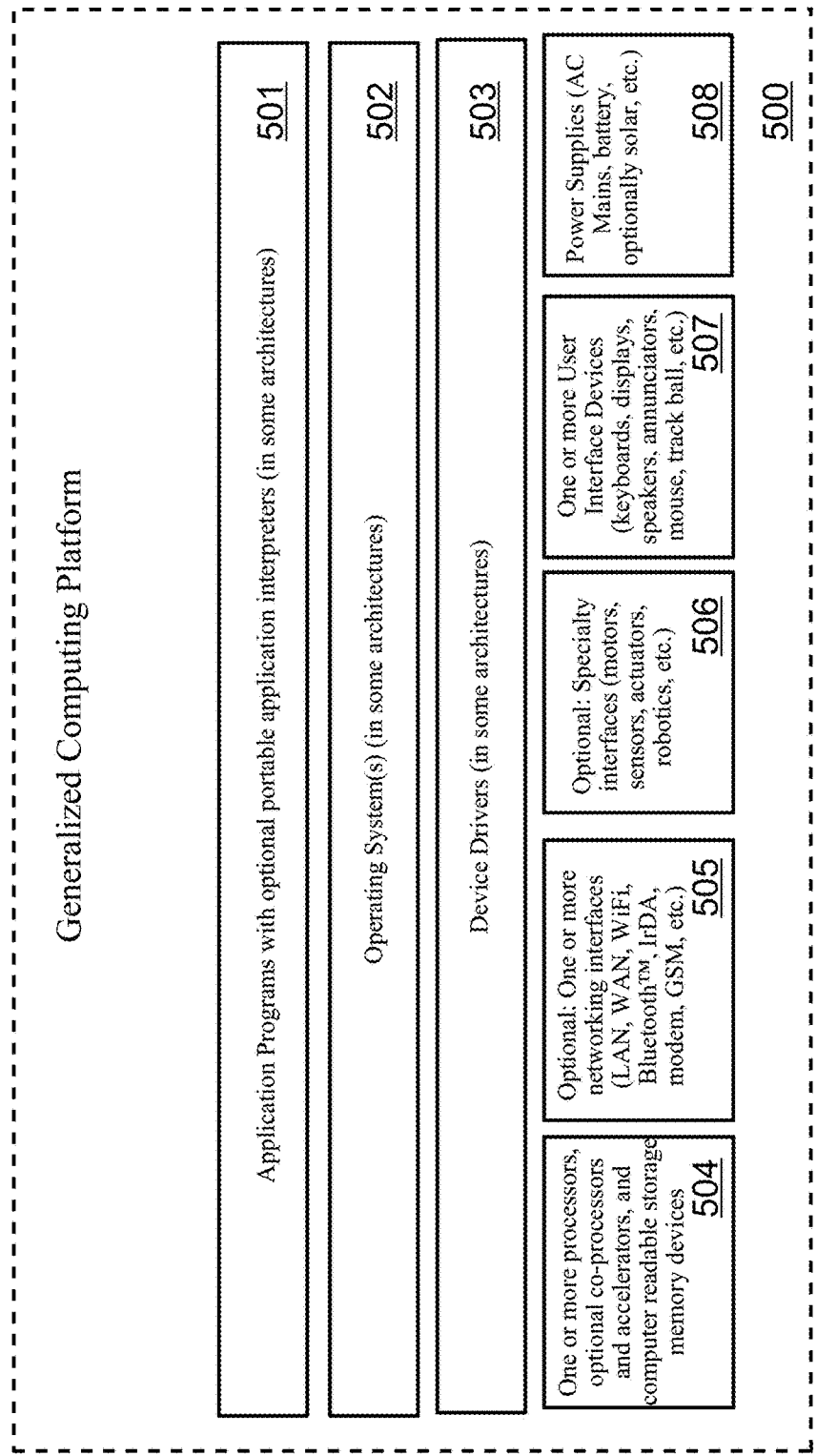
FIG. 5 sets forth a generalized architecture of computing platforms suitable for at least one embodiment of the present and the related inventions.

The present invention may be realized for many different processors used in many different computing platforms. FIG. 5 illustrates a generalized computing platform (500), such as common and well-known computing platforms such as "Personal Computers", web servers such as an IBM iSeries™ server, and portable devices such as personal digital assistants and smart phones, running a popular operating systems (502) such as Microsoft™ Windows™ or IBM™ AIX™, UNIX, LINUX, Google Android™, Apple iOS™, and others, may be employed to execute one or more application programs to accomplish the computerized methods described herein. Whereas these computing platforms and operating systems are well known an openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (501) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The "hardware" portion of a computing platform typically includes one or more processors (504) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (505) may be provided, as well as specialty interfaces for specific applications. If the computing platform is intended to interact with human users, it is provided with one or more user interface devices (507), such as display(s), keyboards, pointing devices, speakers, etc. And, each computing platform requires one or more power supplies (battery, AC mains, solar, etc.).

Conclusion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process(es).

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A method comprising:
   introducing, by a computer, a first level into a first electronic hierarchical model in computer memory representing a first electronic text, wherein the first level comprises semantic relationships extracted from within the first electronic text, wherein at least one semantic relationship comprises a triple store in computer memory, the triple store having a pair of digital information items and an indication of an ontological relationship between the pair of digital information items;
   abstracting, by a computer, a plurality of plot details and character relationships from the first level of the first electronic hierarchical model in computer memory;
   introducing, by a computer, at least a second level of semantic relationships to the first electronic hierarchical model in computer memory, wherein the second level is more abstract and less detailed than the first level; and
   outputting, by a computer, the electronic hierarchical model for access by a user or user process.

2. The method as set forth in claim 1 wherein a highest abstraction level of at least one of the electronic hierarchical models comprises a literary element category selected from the group consisting of genre, setting, central storyline event, and mood.

3. The method as set forth in claim 1 further comprising detecting, by a computer, deep semantic relationships of a consumption history of the user, and correlating the consumption history relationships to the identified events of the electronic text identify one or more other electronic texts of likely interest to the user.

4. The method as set forth in claim 1 wherein the first electronic text comprises a work of literature selected from the group consisting of an electronic book, an electronic play, an electronic novel, a transcription of a video or movie, an electronic magazine, an electronic reference book, and electronic research paper.

5. The method as set forth in claim 1 wherein the extracting, identifying and abstracting are repeated for a plurality of different electronic texts, and wherein the method further comprises, by a computer:
   aggregating user ratings from the same user across the different electronic texts;
   cross-referencing one or more elements across the different electronic texts to infer commonalities and distinctions; and
   inferring one or more literary elements the user is inclined to enjoy according to the aggregated user ratings according to the commonalities, or according to the distinctions, or according to both the commonalities and the distinctions; and
   designating one or more of the different electronic texts with a likely user rating.

6. The method as set forth in claim 5 wherein the extracting, identifying and abstracting are repeated for a plurality of different electronic texts forms an electronic model for each different electronic text, each model having a plurality of abstraction level, and wherein the cross-referencing comprises overlaying cross-sections within topographical nodes of two or more of the electronic models.

7. The method as set forth in claim 5 wherein the designating comprises recommending a different electronic text that the user is likely to prefer.

8. The method as set forth in claim 5 wherein the designating comprises dissuading against a different electronic text that the user is unlikely to prefer.

9. A computer program product for automatic semantic rating and abstraction of literature comprising:
   a tangible, computer-readable memory which is not a propagating signal per se; and
   program instructions encoded by the tangible, computer-readable memory which, when executed by a processor, cause the processor to:
   introduce, by a computer, a first level into a first electronic hierarchical model in computer memory representing a first electronic text, wherein the first level comprises semantic relationships extracted from within the first electronic text, wherein at least one semantic relationship comprises a triple store in computer memory, the triple store having a pair of digital information items and an indication of an ontological relationship between the pair of digital information items;

abstract, by a computer, a plurality of plot details and character relationships from the first level of the first electronic hierarchical model in computer memory;

introduce, by a computer, at least a second level of semantic relationships to the first electronic hierarchical model in computer memory, wherein the second level is more abstract and less detailed than the first level; and output, by a computer, the electronic hierarchical model for access by a user or user process.

10. The computer program product as set forth in claim 9 wherein a highest abstraction level of at least one of the electronic hierarchical models comprises a literary element category selected from the group consisting of genre, setting, central storyline event, and mood.

11. The computer program product as set forth in claim 9 wherein the program instructions further comprise instructions to detect deep semantic relationships of a consumption history of the user, and correlating the consumption history relationships to the identified events of the electronic text identify one or more other electronic texts of likely interest to the user.

12. The computer program product as set forth in claim 9 wherein the electronic text comprises a work of literature selected from the group consisting of an electronic book, an electronic play, an electronic novel, a transcription of a video or movie, an electronic magazine, an electronic reference book, and electronic research paper.

13. The computer program product as set forth in claim 9 wherein the extracting, identifying and abstracting are repeated for a plurality of different electronic texts, and wherein the method further comprises:

aggregating user ratings from the same user across the different electronic texts;

cross-referencing one or more elements across the different electronic texts to infer commonalities and distinctions; and inferring one or more literary elements the user is inclined to enjoy according to the aggregated user ratings according to the commonalities, or according to the distinctions, or according to both the commonalities and the distinctions; and designating one or more of the different electronic texts with a likely user rating.

14. The computer program product as set forth in claim 13 wherein the extracting, identifying and abstracting are repeated for a plurality of different electronic texts forms an electronic model for each different electronic text, each model having a plurality of abstraction level, and wherein the cross-referencing comprises overlaying cross-sections within topographical nodes of two or more of the electronic models.

15. The computer program product as set forth in claim 13 wherein the designating comprises recommending a different electronic text that the user is likely to prefer.

16. The computer program product as set forth in claim 13 wherein the designating comprises dissuading against a different electronic text that the user is unlikely to prefer.

17. A system for automatic semantic rating and abstraction of literature comprising:

a computer processor;

a tangible, computer-readable memory which is not a propagating signal per se; and program instructions encoded by the tangible, computer-readable memory which, when executed, cause the processor to:

introduce, by a computer, a first level into a first electronic hierarchical model in computer memory representing a first electronic text, wherein the first level comprises semantic relationships extracted from within the first electronic text, wherein at least one semantic relationship comprises a triple store in computer memory, the triple store having a pair of digital information items and an indication of an ontological relationship between the pair of digital information items;

abstract, by a computer, a plurality of plot details and character relationships from the first level of the first electronic hierarchical model in computer memory;

introduce, by a computer, at least a second level of semantic relationships to the first electronic hierarchical model in computer memory, wherein the second level is more abstract and less detailed than the first level; and output, by a computer, the electronic hierarchical model for access by a user or user process.

18. The system as set forth in claim 17 wherein a highest abstraction level of at least one of the electronic hierarchical models comprises a literary element category selected from the group consisting of genre, setting, central storyline event, and mood.

19. The system as set forth in claim 17 wherein the program instructions further comprise instructions to detect deep semantic relationships of a consumption history of the user, and correlating the consumption history relationships to the identified events of the electronic text identify one or more other electronic texts of likely interest to the user.

20. The system as set forth in claim 17 wherein the electronic text comprises a work of literature selected from the group consisting of an electronic book, an electronic play, an electronic novel, a transcription of a video or movie, an electronic magazine, an electronic reference book, and electronic research paper.

* * * * *